(12) United States Patent
Tosetti et al.

(10) Patent No.: US 8,095,005 B2
(45) Date of Patent: Jan. 10, 2012

(54) MULTIMODE FIBER LINK PROBE

(75) Inventors: Carlo Tosetti, Sondrio (IT); Giuseppe Pietro Ravasio, Capriate (IT); Damiano Rossetti, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 11/924,850

(22) Filed: Oct. 26, 2007

(65) Prior Publication Data

US 2009/0110390 A1   Apr. 30, 2009

(51) Int. Cl.
*H04B 10/08* (2006.01)
*H04B 17/00* (2006.01)

(52) U.S. Cl. ........................................... 398/29
(58) Field of Classification Search ................. 398/9, 13, 398/16, 20, 33, 143
See application file for complete search history.

(56) References Cited

U.S. PATENT DOCUMENTS

| 6,252,692 | B1 | 6/2001 | Roberts |
| 6,694,273 | B2 | 2/2004 | Kurooka et al. |
| 6,909,742 | B1 * | 6/2005 | Leonosky ..................... 375/232 |
| 7,147,387 | B2 | 12/2006 | Aronson et al. |
| 2006/0263084 | A1 | 11/2006 | Swenson et al. |
| 2007/0092197 | A1 | 4/2007 | Mitchell et al. |
| 2010/0142603 | A1 * | 6/2010 | Linsday et al. ............... 375/227 |

FOREIGN PATENT DOCUMENTS

WO   9418649 A1   8/1994

OTHER PUBLICATIONS

IEEE Draft P802.3aqTM/D4.0, Draft Amendment to IEEE Std. 802.3—2005, Draft Amendment to IEEE Standard for Information technology—Telecommunications and information exchange between systems—Local and metropolitan area networks—Specification requirements, Part 3: Carrier Sense Multiple Access with Collision Detection (CSMA/CD) Access Method and Physical Layer Specifications, Amendment: Physical Layer and Management Parameters for 10 Gb/s Operation, Type 10GBASE-LRM, May 2006, pp. 1-56.

* cited by examiner

*Primary Examiner* — Shi K Li

(57) ABSTRACT

A link probe for multimode fibers in optical networks is provided. An optical test probe signal is sent over a multimode fiber of an optical network link and a receiver converts the optical signal into an electronic signal with a trigger generated by the clock recovery section of an EDC (electronic dispersion compensation) unit. The digital signal is processed by a modified IEEE algorithm to determine a TWDP (Transmitter and Waveform Dispersion Penalty) parameter which quantifies the transmission quality of the multimode fiber and link suitability to LRM transmission.

20 Claims, 4 Drawing Sheets

MULTIMODE FIBER LINK PROBE

BACKGROUND OF THE INVENTION

The present invention is related to optical networks and, in particular, to optical networks with multimode optical fibers.

Today most optical fibers being installed are single-mode optical fibers. This is especially true for the so-called long-haul networks, such as the optical networks which form the backbone of national and international communications networks. In contrast, much of the legacy optical fibers are multimode optical fibers. Over 80% of the optical fiber cabling installed for local area networks is multimode optical fiber.

The quality of links made from multimode fibers is problematical and difficult to predict. As a matter of fact, in single-mode fiber systems chromatic dispersion is the parameter which effectively and predictably characterizes the linear performance propagation of optical signals through a network link. As chromatic dispersion increases, the bit error rate (BER) increases. On the contrary, multimode fibers have no such parameter nor testing methodology to forecast the performance of a multimode fiber link.

Furthermore, the current increase in data transfer rates, i.e., past 1 Gbps (Gigabits per second) toward 10 Gbps and beyond, and the use of laser sources for such high-speed transmissions, as opposed to low-rate LED (Light-Emitting Diode) sources, have further exacerbated this problem for multimode fibers of which there are many different performance types. Many deployed multimode fibers are not readily suitable for 10 Gbps rates. Modal dispersion, the distortion of a signal propagating along the different modes of a multimode fiber, is accentuated by higher bit rates and multimode fibers are sensitive to how signals are launched into the fibers, i.e., what light sources are used for the generation of optical signals in the fibers.

Some way of ascertaining the quality of a multimode fiber link is very desirable to determine whether the link can carry the signals as required in a high-speed network. Furthermore, it should be practical and inexpensive for convenient in situ usage in real multimode fiber network systems, as compared to laboratory systems.

The present invention is directed toward a probe for multimode fibers so that the quality of multimode fiber links can be determined and high-speed systems, such as 10 Gbps systems, can operate effectively over multimode fibers. The probe is practical and inexpensive.

DETAILED DESCRIPTION OF THE INVENTION

Figure 1A:
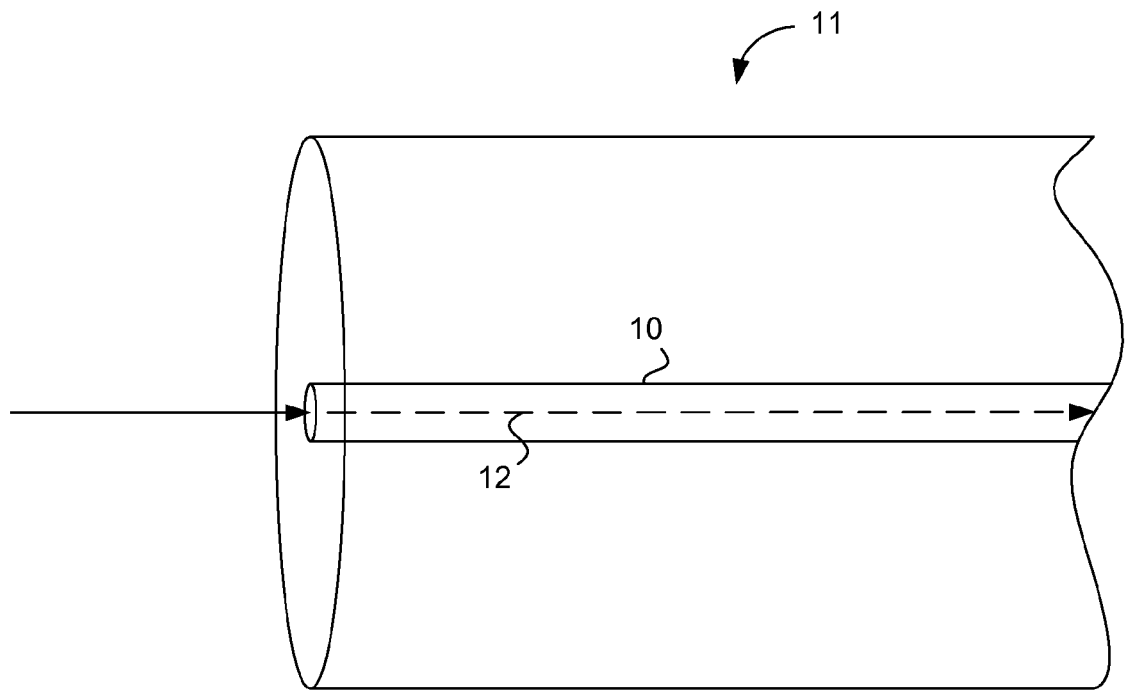
FIGS. 1A and 1B illustrate graphically the light propagation in a single mode fiber and a multimode fiber respectively.

In an overview of the present invention:

One aspect provides for a probe for a multimode fiber link in an optical network, the probe comprising a receiver for receiving a repeating optical test signal sequence of bits at one end of the multimode fiber link. The receiver has a photodiode, an electronic dispersion compensation circuit, an analog-to-digital circuit and a digital signal processing circuit. The photodiode converts the received optical test signal sequence of bits into analog electronic signals. From the analog electronic signals the electronic dispersion compensation circuit generates a clock signal having a first rate corresponding to a bit rate of the optical test sequence of bits propagating through the multimode fiber link. The analog-to-digital circuit converts the analog electrical signals into digital electronic signals at a sampling rate much lower than the first rate, and the digital signal processing circuit processes the digital electronic signals with an algorithm to determine a parameter to quantify a dispersion penalty due to propagation of the optical test signal sequence of bits along the multimode fiber of the link. This allows in situ probing of the multimode fiber link to be performed. The probe can further comprise a transmitter for generating the repeating optical test signal sequence of bits at a second end of said multimode fiber link.

Another aspect of the present invention provides for a method of probing a multimode fiber link in an optical network. The method comprises the steps of: launching an optical test signal sequence of bits into a first end of the multimode fiber link; receiving the optical test signal sequence of bits at a second end of the multimode fiber link; converting the received optical test signal sequence of bits into digital electronic signals; and processing the digital electronic signals with an IEEE 802.3aq algorithm to determine a parameter to quantify a dispersion penalty due to propagation of the optical test signal sequence of bits along the multimode fiber of the link; wherein in situ probing of the multimode fiber link is performed. The algorithm calculates a TWDP (Transmitter and Waveform Dispersion Penalty) with a parameter set to avoid introduction of a dispersion penalty from emulation of propagation of the optical test signal sequence of bits along the multimode fiber of the link.

Still another aspect of the present invention provides for a method of probing a multimode fiber link in an optical network. The method comprises the steps of: launching a repeating optical test sequence of bits into a first end of the multimode fiber link, the optical test sequence of bits propagating through the multimode fiber link at a first clock rate; receiving the repeating optical test sequence of bits at a second end of the multimode fiber link; converting the received optical test signal sequence of bits into digital electronic signals at a sampling rate much lower than the first clock rate; and processing the digital electronic signals with an algorithm to determine a parameter to quantify a dispersion penalty due to propagation of the optical test signal sequence of bits along the multimode fiber of the link; wherein in situ probing of the multimode fiber link is performed. The digital electronic signals converting step includes converting the received optical test signal sequence of bits into analog electronic signals; and the probing method further comprises determining a clock signal at the first clock rate from said analog electronic signals and decimating the clock signal from the first clock rate by the number of bits in the optical test signal sequence. The digital electronic signals converting step further includes converting the received optical test signal sequence of bits at one sampling point for each received optical test sequence of bits, the sampling point delayed by a controlled amount for each received optical test sequence of bits so that each bit of the optical test signal sequence is completely sampled after a predetermined number of the optical test signal sequence of bits are received.

Figure 1B:
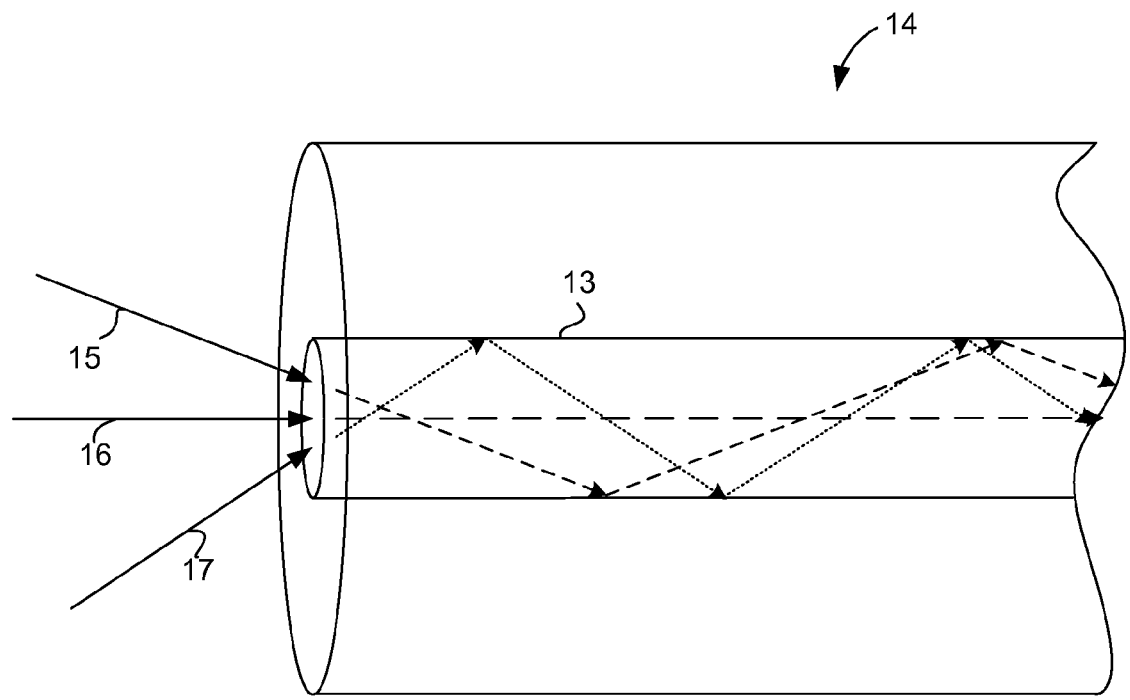

FIGS. 1A and 1B illustrate the propagation of light in single mode optical fibers and multimode optical fibers. Generally stated, the core 10 of a single mode fiber 11 has a very small diameter, 6-9 μm, so that light can propagate in only one way, i.e., mode, through the optical fiber. This is shown by the single arrow 12 illustrating the path of the light through the center of the core 10 in FIG. 1A. On the other hand, the core 13 of a multimode fiber 14 is large enough, principally 50 and 62.5 µm, to accommodate different modes of propagation as illustrated by three arrows 15-17 in FIG. 1B. The three different modes of propagation shown are representative of the many modes of propagation. The light in each mode has a different path and travels a different distance. A signal formed by the light in the different modes arrives at a destination at different times and hence there is a dispersion of the signal, an undesirable degradation of the signal caused by the multimode fiber.

The ability to characterize the quality of multimode fiber links is very useful due to the abundance of many different multimode fibers installed in older networks. This mixed assortment of legacy fibers evolved with increasing data rates and corresponding light sources. Many different and increasingly complex techniques, such as OFL (Over-Filled Launch), RML (Restricted Modal Launch) and DMD (Differential Mode Delay), have been used to characterize the quality of multimode fiber links to assess link performances and correlation with sensitivity results. For example, for particular laser sources generating optical signals at 10 Gbps, what is the expected BER (Bit Error Rate) at a defined distance along the multimode fiber link? But these techniques which were created for one generation of multimode fiber systems are proving to be incapable of characterizing the quality of high-speed links with many different multimode fibers.

None of these techniques are sufficient to effectively assess link quality. For example, OFL was introduced for LED-optimized multimode fibers and modern systems rely on, first, laser sources which differ greatly from LEDs for characterization purposes and, secondly, lasers sources which operate at much higher data rates than those envisioned at the time the techniques were introduced. Even with the assumption of the efficacy of these techniques, extremely sophisticated and complex equipment suitable only to be set up in test laboratories are required. This makes it difficult for a practical evaluation of a multimode fiber link in situ, that is, in the field where actual networks are located.

To overcome these problems, the present invention uses the work incorporated in the recent IEEE 802.3aq standard for 10GBASE-LRM (Long Reach Multimode) interface for handling 10 Gbps data, more specifically, 10 Gigabit Ethernet data, for multimode fibers. The 10GBASE-LRM interface includes a receiver EDC (Electronic Dispersion Compensation) circuit which permits adaptive electronic equalization of incoming optical modal dispersion to eliminate dependency on fiber types.

Figure 2:
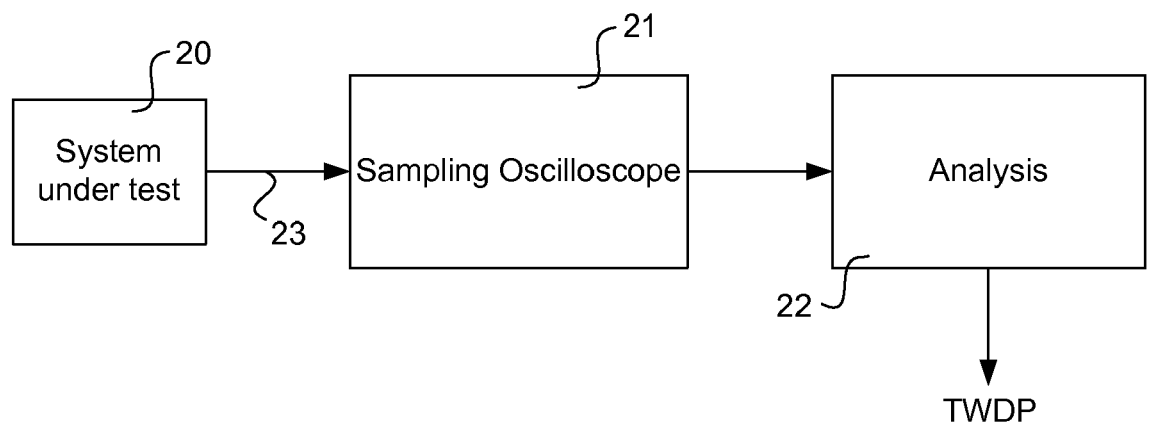
FIG. 2 illustrates a testing arrangement for transmitters pursuant to the IEEE 802.3aq standard.

The IEEE 802.3aq standard defines TWDP (Transmitter and Waveform Dispersion Penalty) as a parameter able to assess the robustness of a transmitter's signal propagated over a multimode fiber link. FIG. 2 illustrates an IEEE 802.3aq test setup for determining TWDP to ascertain the suitability of a transmitter for 10 Gbps multimode fiber links. The transmitter 20 to be tested is connected by an optical patch cord 23 to a sampling oscilloscope 21. An oscilloscope with a $4^{th}$ order, 7.5 GHz Bessel-Thomson response for waveform acquisition is suitable. The optical signal from the transmitter 20 is electronically captured by the sampling oscilloscope 21 and the waveform data from the transmitter 20 are analyzed by an algorithm which simulates the propagation of the light through three different worst-case channel models developed by the IEEE. The simulation can be may be implemented in the oscilloscope 21 (if suitable) or by a separate analysis unit 22 as illustrated in FIG. 2. TWDP is a measure of the deterministic dispersion penalty derived from intersymbol interference (ISI) after the propagation of the optical output from the particular transceiver has been simulated through an emulated multimode fiber for a well-characterized receiver, i.e., an emulated receiver with EDC functions. Propagation is simulated through three different worse case channel models developed for the standard. The resulting TWDP from the analysis unit 22 measures the suitability of the transmitter 20 in meeting the 10GBASE-LRM requirements or not.

The same parameter can be used to determine the actual propagation performance of a real multimode fiber link with a modification of the TWDP algorithm defined in clause 68.6.6.2 of the IEEE 802.3aq standard, all of which is incorporated herein by reference. To bypass the propagation simulated in the algorithm, the FiberResp parameter is set to (0,1,0,0) following the note in clause 68.6.9.3 so that no emulation penalty is introduced. The resulting modified TWDP parameter, termed uTWDP for unitary TWDP by the inventors, provides for the quantification of a dispersion penalty due to propagation along a real multimode fiber.

But heretofore uTWDP measurements, as far as is known, can be performed only with discrete and bulky laboratory instrumentation. The ability to access both ends of the link in the same physical space is required and the only known commercially available probe requires an external sampling oscilloscope, which is bulky and expensive, at the receiving end. The oscilloscope is triggered by a corresponding transmitter which transmits a PRBS (Pseudo-Random Bit Sequence) at the opposite end of the multimode fiber, much like the arrangement of FIG. 2. Installation of such equipment for an in situ probe of a network link is difficult and impractical.

Figure 3:
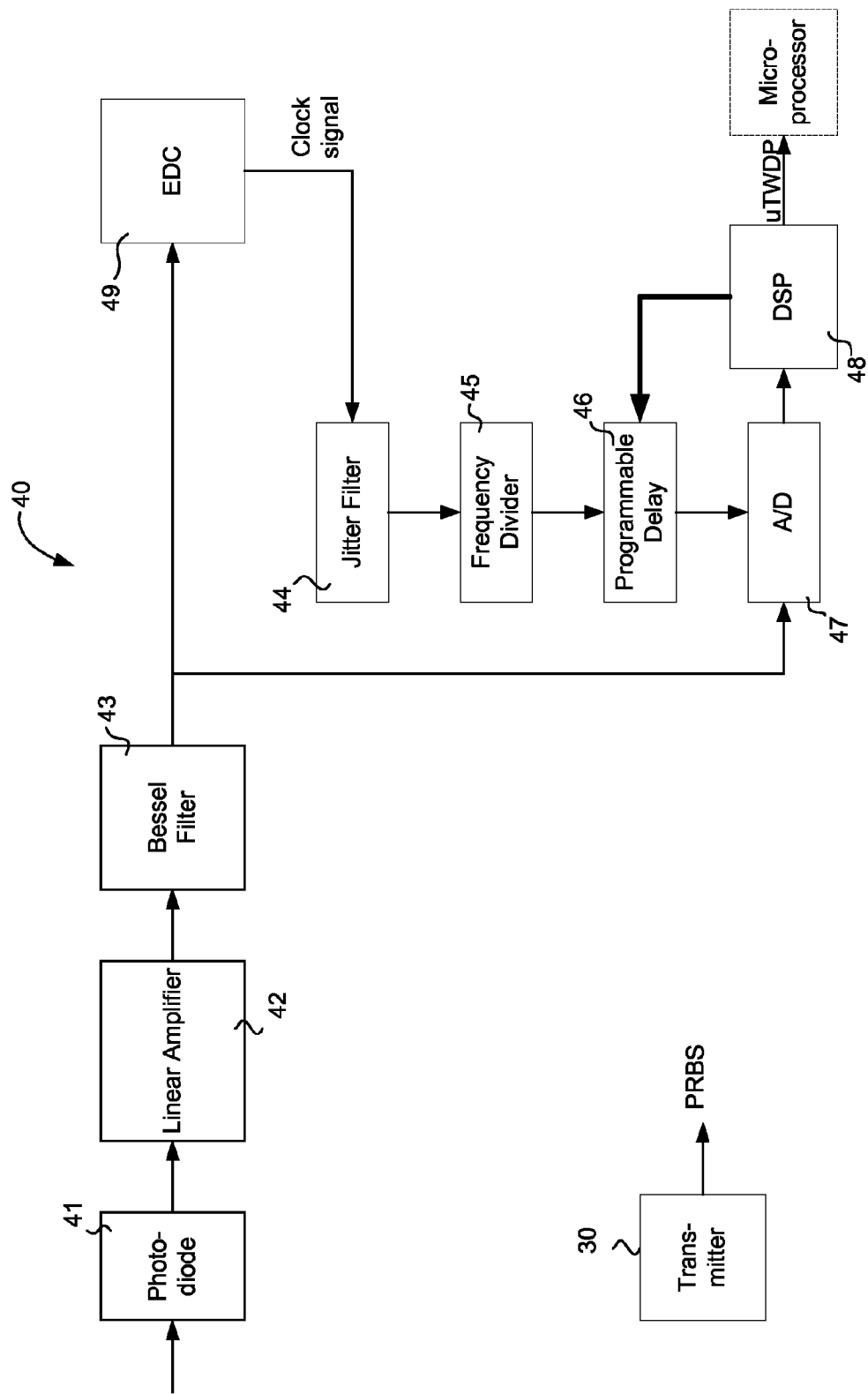
FIG. 3 illustrates an in situ probe for a multimode fiber link, according to one embodiment of the present invention.

The present invention creates a practical probe for real multimode fiber links to determine the actual performance of such links in a 10 Gbps network, or more specifically, whether a multimode fiber link is suitable for LRM applications. The multimode fiber link probe is shown by a block diagram in FIG. 3, according to one embodiment of the present invention. The probe includes a transmitter 30 which generates a $2^9-1$, i.e., 511, bit PRBS (PseudoRandom Bit Sequence) for the multimode fiber link to be probed. The transmitter 30 can be part of a network card which is operative during normal operations of the network link. This allows for a probe to be operated in situ, that is, in the field, easily. During the operations of a multimode fiber link probe, the transmitter 30 launches the same sequence of generated bits repeatedly into one end of the link.

The probe also includes a receiver 40 at a second end of the multimode fiber formed by a receiver optical subassembly formed by a photodiode 41, linear amplifier 42, a Bessel filter circuit block 43 and an EDC (Electronic Dispersion Compensation) circuit block 49, as suggested by the IEEE 802.3aq standard. The photodiode 41, preferably a PiN (P-region/intrinsic region/N-region) diode, converts the optical signals from the transmitter 30 over the multimode fiber link into electrical signals. The electrical signals are amplified by the linear amplifier 42 before the amplified signals are filtered by the Bessel filter block 43 to remove unwanted noise. The filtered electrical signals are sent to the EDC circuit block 49 which performs the recovery of the clock from the electrical signals of the incoming modally dispersed optical signals and which is to be fed to the following data sampler.

Besides the receiver optical subassembly, the receiver 40 also includes an A/D (Analog-to-Digital) converter circuit block 47, a programmable delay circuit block 46, a frequency divider circuit block 45, a jitter filter 44 and a DSP (Digital Signal Processing) circuit block 48. The converter 47 is connected to the Bessel filter 43 which also feeds the EDC circuit block 49. The converter 47 is triggered by the output of the programmable delay circuit block 46 which is connected to a frequency divider circuit block 45 and a DSP (Digital Signal Processing) circuit block 48. The frequency divider block 45 is further connected to the jitter filter circuit block 44 which, in turn, is connected to the EDC block 49. This part of the receiver 40 digitizes the analog electrical signals from the filter 43 for the processing by the DSP block 48 to generate a uTWDP value, a measure of the suitability of the link for LRM applications. The digitizing or sampling of the analog electrical signals is performed at a much lower rate than the 10 Gbps data rate of the transmitter 30.

The trigger is locally generated by the clock recovery section of the EDC block 49, which extracts the clock signal from the much degraded signals, as typically happens after propagation over a multimode fiber link. For LRM applications, the clock signal runs at 10 Gbps. The frequency of the recovered clock signal, filtered by block 44 in order to eliminate excess jitter, is decimated or lowered by the frequency divider block 45 to provide a trigger signal every 511 bits (pattern synchronous trigger) for the A/D circuit block 47. The trigger is generated by a programmable delay block 46 which enables the sampling of every bit in the sequence with multiple samples, much in the same way a sampling oscilloscope works. Programmable delay circuits are commercially available with resolutions down to 10 ps. The different delays needed to correctly sample the entire 511-bit sequence are provided to the programmable delay block 46 by the DSP block 48.

Figure 4:
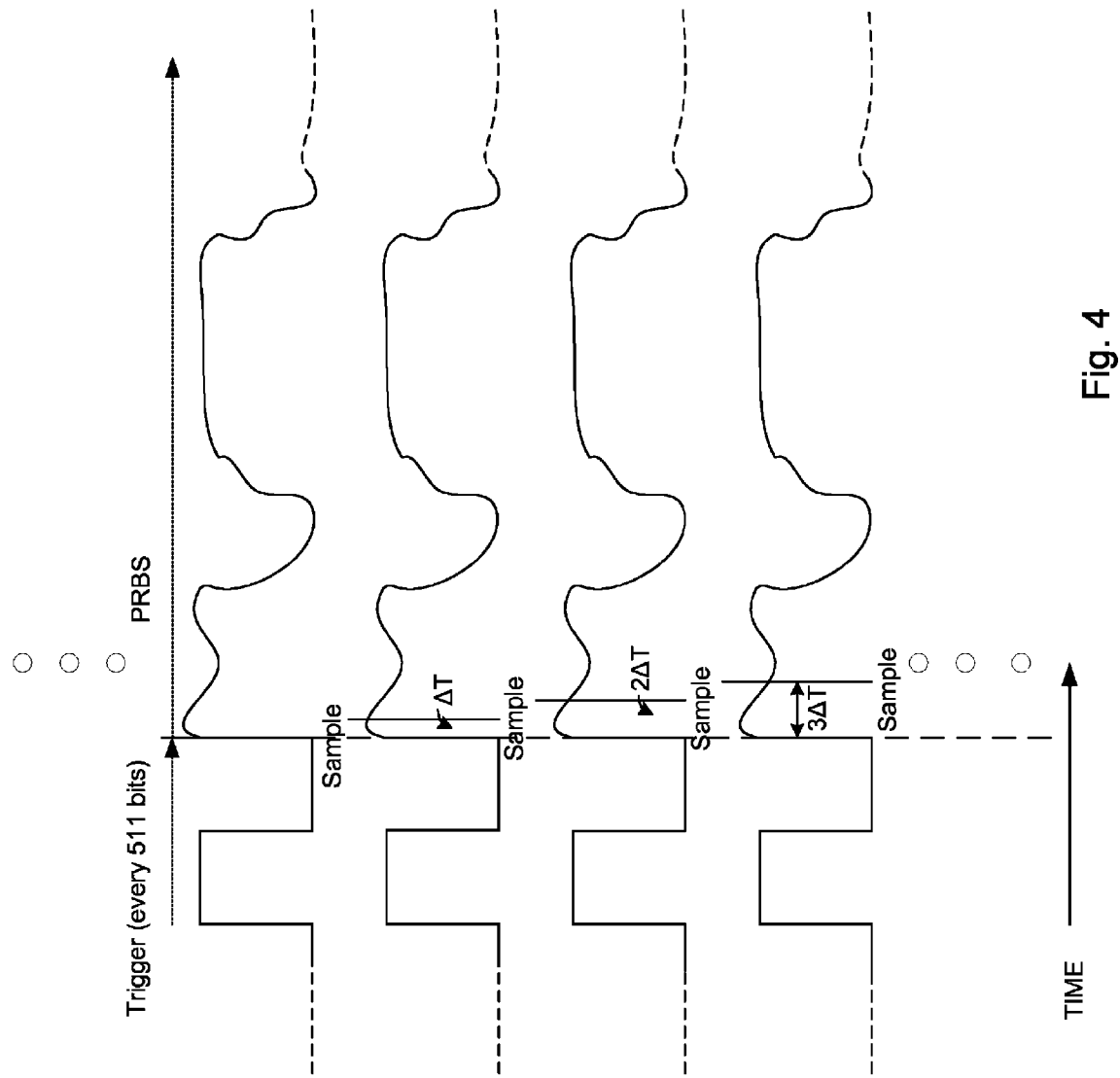
FIG. 4 illustrates the timing of the sampling of the test signal transmitted through the multimode fiber link FIG. 3 probe, according to one embodiment of the present invention.

FIG. 4 illustrates four consecutive sampling operations of the repeating PRBS signals sent by the transmitter 30 over the multimode fiber link. Each sample operation is shown with a trigger signal originally generated by the EDC block 49 and decimated by the frequency divider circuit block 45. The trigger signal is superimposed over the analog PRBS signals received and sampled by the converter 47. Each sample follows a previous sample by a varying delay of one delay's resolution time, $\Delta T$, plus a multiple of the time to repeat the PRBS of 511 bits. Thus, if each sequence bit is sampled 16 times, the PRBS is completely sampled after the transmitter 20 has sent the sequence through the multimode fiber link at least 511×16 times. The programmable delay circuit 46 which triggers the A/D circuit block 47 is itself clocked by the output of the frequency divider circuit 45 which repeats itself every 511 bits and an output from the DSP circuit block 48. The block 48 controls the programmable delay's resolution time, $\Delta T$, by sending its output signal to the programmable delay circuit 46. Parenthetically, if the maximum programmable delay's resolution does not allow the acquisition of, say, 16 samples per bit, a lower number can be accepted if the DSP circuit block 48 can interpolate the missed sample values in accordance with the note in clause 68.6.6.1 of IEEE 802.3aq. With this arrangement, the need for a high speed sample-and-hold operation for the A/D circuit block 47 is avoided.

Once the sampled data are acquired, the DSP circuit block 48, as stated above, processes the sampled data according to a modified version of the TWDP algorithm defined in clause 68.6.6.2 of IEEE 802.3aq standard to obtain a uTWDP, the unitary TWDP, value which quantifies the dispersion penalty due to the signal propagation along a real multimode fiber link. The DSP circuit block 48 implements the modified TWDP algorithm defined in clause 68.6.6.2 of the IEEE 802.3aq standard with the FiberResp parameter set to (0,1,0,0) to bypass the propagation simulated in the algorithm so that no emulation penalty is introduced. The resulting uTWDP value indicates whether the multimode fiber link is capable of LRM applications. If the value is below 4.2 dB, as specified for the worst case stressor in 802.3aq, the link is determined valid.

The output of the DSP unit block 48 determines whether the value of the uTWDP is below 4.2 dB or not. Depending upon the uTWDP value, the DSP block 48 can set a switch to indicate whether the multimode fiber link is good (or bad) for 10 Gbps operations. As illustrated by a dotted box, a microprocessor can also store the uTWDP value to provide a quantitative measure of link performance. If, for example, different multimode fibers are available for the same link, the stored uTWDP values can select the best performing fiber, i.e., the fiber with the largest margin for LRM applications.

The DSP unit 48 can implemented as a standard DSP integrated circuit, such as Model No. TMS320C6713B-300 from Texas Instruments, Inc. of Dallas, Tex.; an fully customized integrated circuit available from many integrated circuit manufacturers or Boundaries; or a customizable integrated circuit, such as an ASIC (Application Specific Integrated Circuit) in which blocks in the integrated circuit are predefined and their functions and connections are customized for the particular application.

The receiver 40 is mounted on a receiver network card for multimode fiber links. With a suitably robust multimode fiber link, as defined above, the elements of the receiver optical subassembly, formed by the photodiode 41, linear amplifier 42, the Bessel filter circuit block 43 and the EDC (Electronic Dispersion Compensation) circuit block 49, operate in normal operations in the reception of signals over multimode fiber links for LRM applications. The balance of the receiver elements, i.e., the jitter filter circuit block 44, frequency divider circuit block 45, programmable delay circuit block 46, A/D (Analog-to-Digital) converter 47 and DSP (Digital Signal Processing) circuit block 48 operate during a probe of a multimode fiber link. Together with the network card carrying the transmitter 30, the transmitter 30 and receiver 40 can probe in situ the suitability of interconnecting multimode fiber links for 10 Gbps operations.

Of course, transmitters 30 and receivers 40, which are separated from network cards, in the form of handheld units, for example, are also contemplated in embodiments of the present inventions.

The addition of a polarization controller at the input end of the multimode fiber link allows exploration of the dynamic properties of the multimode fiber link. Variations in polarization may emulate environmental changes for the link and the uTWDP values taken for each different polarization state at the input of the multimode fiber link can evaluate such changes in the link. In the same manner as with multiple fibers in a link, the transmitter 30 and receiver 40 of the present invention can be used with different MCPs (Mode Conditioning Patchcords) at the input of the multimode fiber link. MCPs with different offset properties can have a significant effect upon link quality and the "best performing" MCP can be selected from the measured uTWDP values.

Thus the present invention uses the procedures of IEEE 802.3aq for testing the suitability of interfaces for 10GBASE-LRM applications for creating a probe for the multimode fiber link between the interfaces. Furthermore, the described embodiment of the present invention is implemented with relatively inexpensive and simple components so that the present invention can be mounted on network cards and the costs of installing and performing a probe is minimized. This in situ probing of actual network multimode fiber links is practical and convenient.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An apparatus comprising:
    a receiver configured to be coupled to a first end of a multimode optical fiber and to receive a repeating optical test signal sequence of bits, said receiver having:
    a photodiode configured to convert said received optical test signal sequence of bits into analog electronic signals;
    an electronic dispersion compensation circuit configured to generate from said analog electronic signals a clock signal having a first rate corresponding to a bit rate of said optical test sequence of bits propagating through said multimode fiber;
    an analog-to-digital circuit configured to convert said analog electrical signals into digital electronic signals at a sampling rate that is lower than said first rate; and
    a digital signal processing circuit configured to process said digital electronic signals to determine a parameter to quantify a dispersion penalty due to propagation of said optical test signal sequence of bits along said multimode fiber, wherein said parameter is configured to indicate a suitability for said multimode fiber to carry traffic at data rates beyond originally designed data rates of said multimode fiber.

2. A system comprising the apparatus of claim 1, further comprising a transmitter configured to generate said repeating optical test signal sequence of bits at a second end of said multimode fiber link.

3. The system of claim 2, wherein said transmitter is configured to be mounted on a first network card connected to said second end of said multimode fiber link and said receiver is configured to be mounted on a second network card connected to said first end of said multimode fiber link.

4. The apparatus of claim 1, further comprising:
    a jitter filter configured to eliminate excess jitter from said clock signal;
    a frequency divider circuit configured to decimate said clock signal from said first rate by said number of bits in said optical test signal sequence to generate said sampling rate; and
    a programmable delay circuit configured to delay sampling times from said decimated clock signal such that each bit of said optical test signal is sampled.

5. The apparatus of claim 1, wherein said digital signal processing circuit is configured to process said digital electronic signals with an IEEE 802.3aq algorithm for calculating said parameter comprising a TWDP (Transmitter and Waveform Dispersion Penalty).

6. The apparatus of claim 5, wherein said digital signal processing circuit is configured to compute said TWDP parameter using said IEEE 802.3aq algorithm that is configured to avoid propagation emulation within said algorithm.

7. The apparatus of claim 6, wherein said first rate is 10 Gigabit per second (Gbps) or greater.

8. A method comprising:
    transmitting an optical test signal sequence of bits at a first end of a multimode fiber link;
    receiving said optical test signal sequence of bits at a second end of said multimode fiber link;
    converting said received optical test signal sequence of bits into digital electronic signals; and
    processing said digital electronic signals with an IEEE 802.3aq algorithm to determine a quality parameter that is configured to quantify a dispersion penalty due to propagation of said optical test signal sequence of bits along said multimode fiber link, wherein processing comprises computing said quality parameter comprising a TWDP (Transmitter and Waveform Dispersion Penalty) with a configuration parameter that is set to avoid introduction of a dispersion penalty from emulation of propagation of said optical test signal sequence of bits along said multimode fiber link.

9. The method of claim 8, wherein said configuration parameter comprises a FiberResp parameter set to (0, 1, 0, 0).

10. The method of claim 8, wherein processing comprises computing said quality parameter that is configured to indicate a suitability for said multimode fiber link to carry traffic at 10 Gigabit per second (Gbps) or greater data rates, and further comprising generating an indication of said suitability of said multimode fiber link.

11. The method of claim 8, wherein said quality parameter comprises a unitary (uTWDP) parameter and further comprising determining whether said uTWDP parameter is below a dB loss threshold to ascertain whether said multimode fiber link as acceptable for 10 GBASE-LRM applications.

12. The method of claim 8, wherein said multimode fiber link comprises a plurality of multimode fibers and processing comprises determining said quality parameter for each multimode fiber of said multimode fiber, and further comprising comparing each quality parameter with other quality parameters to select a multimode fiber from among the plurality of multimode fibers that is most suitable for 10 GBASE-LRM applications.

13. The method of claim 8, wherein said transmitting, receiving, converting and processing are performed on network cards connected to said multimode fiber link.

14. The method of claim 8, wherein said transmitting, receiving, converting and processing are performed with handheld units connected to said multimode fiber link.

15. A method comprising:
    receiving a repeating optical test signal sequence of bits at a second end of said multimode fiber link that was transmitted into a first end of said multimode fiber link at a first clock rate;
    converting said received optical test signal sequence of bits into digital electronic signals at a sampling rate lower than said first clock rate; and
    processing said digital electronic signals to determine a parameter to quantify a dispersion penalty due to propagation of said optical test signal sequence of bits along said multimode fiber link, wherein said parameter is configured to indicate a suitability for said multimode fiber link to carry traffic at data rates beyond originally designed data rates of said multimode fiber link.

16. The method of claim 15, wherein said first clock rate is 10 Gigabit per second (Gbps) or greater.

17. The method of claim 15, further comprising:
    converting said received optical test signal sequence of bits into analog electronic signals;
    determining a clock signal at said first clock rate from said analog electronic signals;

decimating said clock signal from said first clock rate by said number of bits in said optical test signal sequence to produce said sampling rate; and delaying sampling points at said decimated sampling rate to selectively sample individual bits of said optical test signal sequence.

18. The method of claim 15, wherein processing comprises processing said digital electronic signals with an IEEE 802.3aq algorithm configured without propagation emulation.

19. The method of claim 15, further comprising generating an indication of said suitability of said multimode fiber to carry traffic at data rates beyond originally designed data rates of said multimode fiber link.

20. The method of claim 15, wherein processing comprises processing said digital electronic signals with an IEEE 802.3aq to determine said parameter comprising a TWDP (Transmitter and Waveform Dispersion Penalty).

* * * * *